United States Patent [19]
Ko

[11] Patent Number: 6,050,103
[45] Date of Patent: Apr. 18, 2000

[54] AIR CONDITIONING SYSTEM

[75] Inventor: Jin-ho Ko, Sacheon, Rep. of Korea

[73] Assignee: Samsung Aerospace Industries, Ltd., Kyongsangnam-do, Rep. of Korea

[21] Appl. No.: 08/999,004

[22] Filed: Dec. 29, 1997

[30] Foreign Application Priority Data

Dec. 31, 1996 [KR] Rep. of Korea ............ 96-67441
Aug. 29, 1997 [KR] Rep. of Korea ............ 97-42926

[51] Int. Cl.[7] ............................................. F25D 9/00
[52] U.S. Cl. ................................. 62/401; 62/87; 62/402
[58] Field of Search .............................. 62/86, 87, 88, 62/401, 402

[56] References Cited

U.S. PATENT DOCUMENTS

| | | | |
|---|---|---|---|
| 2,204,169 | 6/1940 | Zerkowitz | 62/402 |
| 2,961,847 | 11/1960 | Whitney, Jr. et al. | 62/402 X |
| 3,713,294 | 1/1973 | Balje et al. | 62/402 X |
| 3,877,246 | 4/1975 | Schutze | 62/402 |
| 5,133,194 | 7/1992 | Army, Jr. et al. | 62/402 X |
| 5,311,749 | 5/1994 | McAuliffe et al. | 62/402 |
| 5,392,614 | 2/1995 | Coffinberry | 62/402 |
| 5,636,523 | 6/1997 | Assaf | 62/402 |
| 5,784,894 | 7/1998 | Army, Jr. et al. | 62/402 |

*Primary Examiner*—Christopher B. Kilner
*Attorney, Agent, or Firm*—Finnegan, Henderson, Farabow, Garrett & Dunner, L.L.P.

[57] ABSTRACT

An air conditioning system including a compressor for compressing high temperature air supplied by an engine, a turbine for cooling the compressed air by expanding the compressed air, a condenser which is connected to the turbine and condenses air, and an axially hollow rotation shaft coaxially coupling the compressor and the turbine, the shaft allowing a portion of the high temperature air flowing in the compressor to pass through the shaft toward the turbine for mixing with the air cooled in the turbine and supplied to the condenser.

8 Claims, 4 Drawing Sheets

AIR CONDITIONING SYSTEM

BACKGROUND OF THE INVENTION

The present invention relates to an air conditioning system for controlling air inside an airplane, a vessel or a vehicle to maintain the air in a fresh state.

As shown in FIG. 1, a conventional air conditioning system for controlling air inside a room such as a cockpit in an airplane includes a first heat exchanger 10 for dropping the temperature of a portion of high temperature and high pressure air supplied by an engine, an air cycle machine 20 having a compressor 21 for compressing the air supplied from the first heat exchanger 10 and a turbine 22 for cooling the flowing-in air by expanding the same, a second heat exchanger 11 for dropping the temperature of air supplied from the compressor 21, a reheater 12 for reheating the air, a condenser 13 for condensing the air which has passed through the reheater 12 by exchanging heat with the air cooled in the turbine 22, and a moisture separator 14 for removing moisture from the condensed air. Here, the turbine 22 is coupled to a rotation shaft 23 of the compressor 21, and the rotation shaft 23 rotates by being supported by an air bearing 24.

Reference numerals 31, 32 and 33 represent valves for selectively blocking the high temperature air supplied by the engine; reference numeral 34 represents a valve for bypassing the air which has passed through the first heat exchanger 11; and reference numeral 30 represents a controller for opening/closing the valves. Accordingly, when the valves 31 and 33 open according to instructions by the controller 30, the high temperature air supplied by the engine is supplied directly to the cockpit. When the valves 31 and 32 open, the high temperature air is supplied to the condenser 13. That is, the high temperature air can be supplied to a desired path by opening/closing the above valves by the controller 30. Also, reference numerals S1 and S2 represent first and second pressure sensors for measuring difference of pressure at an inlet and an outlet of the condenser 13, respectively.

In the operation of the conventional air conditioning system structured as above, a portion of high temperature and high pressure air supplied by the engine is cooled in the first heat exchanger 10 and then flows into the compressor 21 of the air cycle machine 20 to be compressed therein. The compressed air is cooled again in the second heat exchanger 11. The cooled air passes through the reheater 12 and the condenser 13 while heat exchange is made. Then, as the air passes through the moisture separator 14, moisture contained in the air is separated and removed. The air having passed through the moisture separator 14 is slightly heated while passing through the reheater 12. Next, the air is rapidly cooled by being expanded in the turbine 22. While passing through the condenser 13 again, the cooled air exchanges heat with the air flowing in the condenser 13 via the second heat exchanger 11 and the reheater 12. Subsequently, the air is blown into a room such as a cockpit.

In the above process, when the air rapidly cooled by being expanded in the turbine 22 passes through the condenser 13, moisture contained in the air is condensed into ice. The 5 condensed ice hinders flow of the air, causing difference in pressure between the inlet and the outlet of the condenser 13.

The difference of pressure is detected by the first and second pressure sensors S1 and S2, and the valve 32 is opened according to the detected signals so that the high temperature air is directly supplied from the engine into the condenser 13 to thereby melt and remove the condensed ice.

However, in the conventional air conditioning system, since expensive pressure sensors, valve and a control circuit for controlling flow of the air should be provided in order to remove the condensed ice in the condenser, the system becomes complicated and manufacturing costs increases.

SUMMARY OF THE INVENTION

To overcome the above problems, it is an objective of the present invention to provide an air conditioning system having a simplified structure which is able to remove the condensed ice inside the condenser.

Accordingly, to achieve the above objective, there is provided an air conditioning system including a compressor which compresses high temperature air supplied by an engine, a turbine for cooling cools the compressed air by expanding the compressed air, a condenser connected to the turbine for condensing air, and a rotation shaft coaxially coupled to the compressor and the turbine, said shaft having an axial hollow which directly connects the compressor and the turbine, allowing a portion of the high temperature air flowing in to the compressor to pass through the hollow the turbine to mix with the air cooled in the turbine prior to being supplied to the condenser.

Also, according to another preferred embodiment of the present invention, there is provided an air conditioning system including a compressor which compresses high temperature air supplied by an engine, a turbine for cooling the compressed air by expanding the compressed air a condenser connected to the turbine for condensing air, a rotation shaft coaxially coupled to the compressor and the turbine, said shaft having an axial hollow which directly connects the compressor and the turbine, allowing a portion of the high temperature air exhausted from the engine to pass through the hollow to the turbine to mix with the air cooled in the turbine prior to being supplied to the condenser, a connection pipe between the engine and an inlet of the hollow of said shaft, said pipe supplying high temperature air from said engine to said inlet, and a regulating means for regulating the amount of air flowing through the connection pipe.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
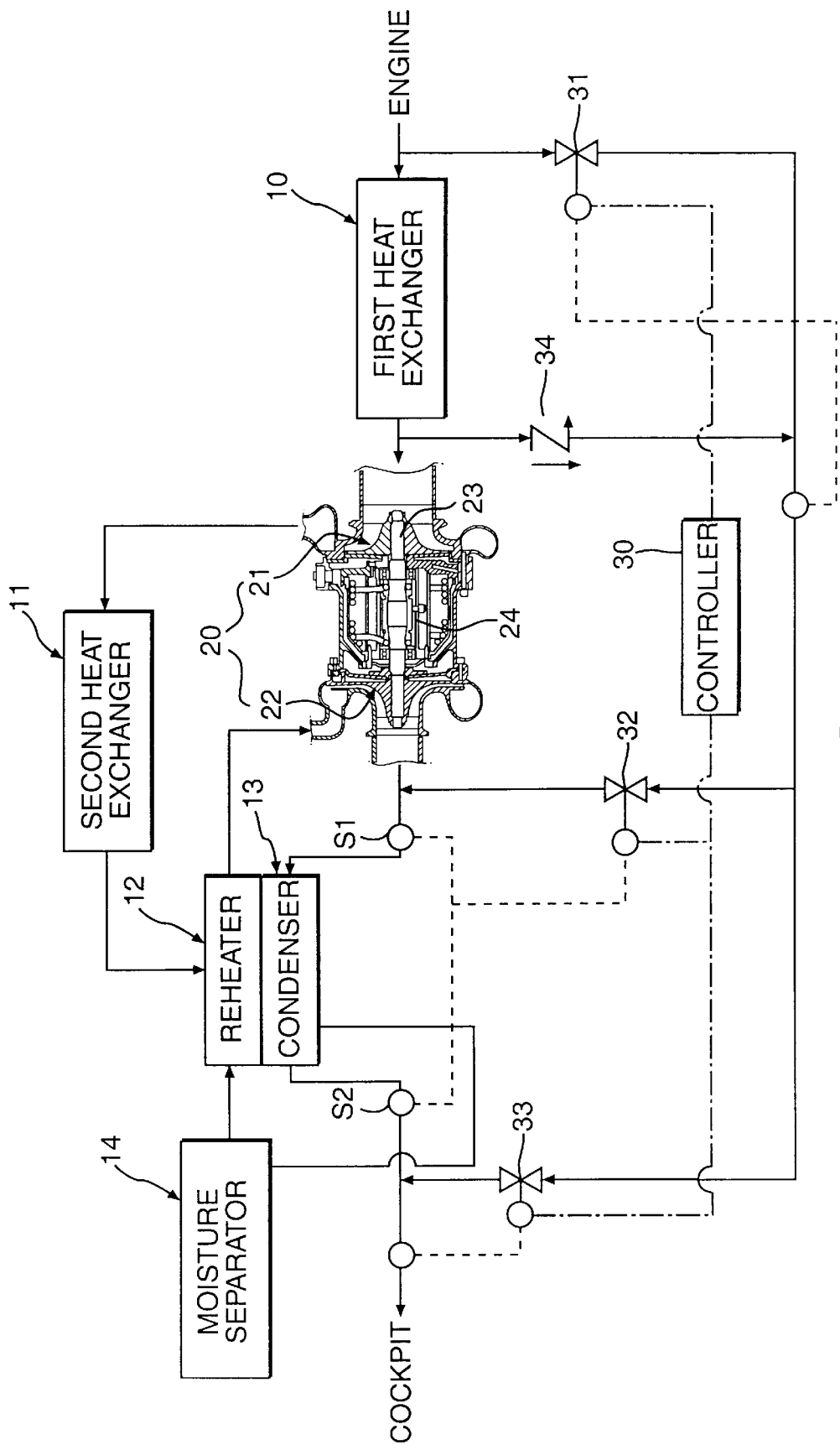
FIG. 1 is a diagram showing the structure of a conventional air conditioning system.
Figure 2:
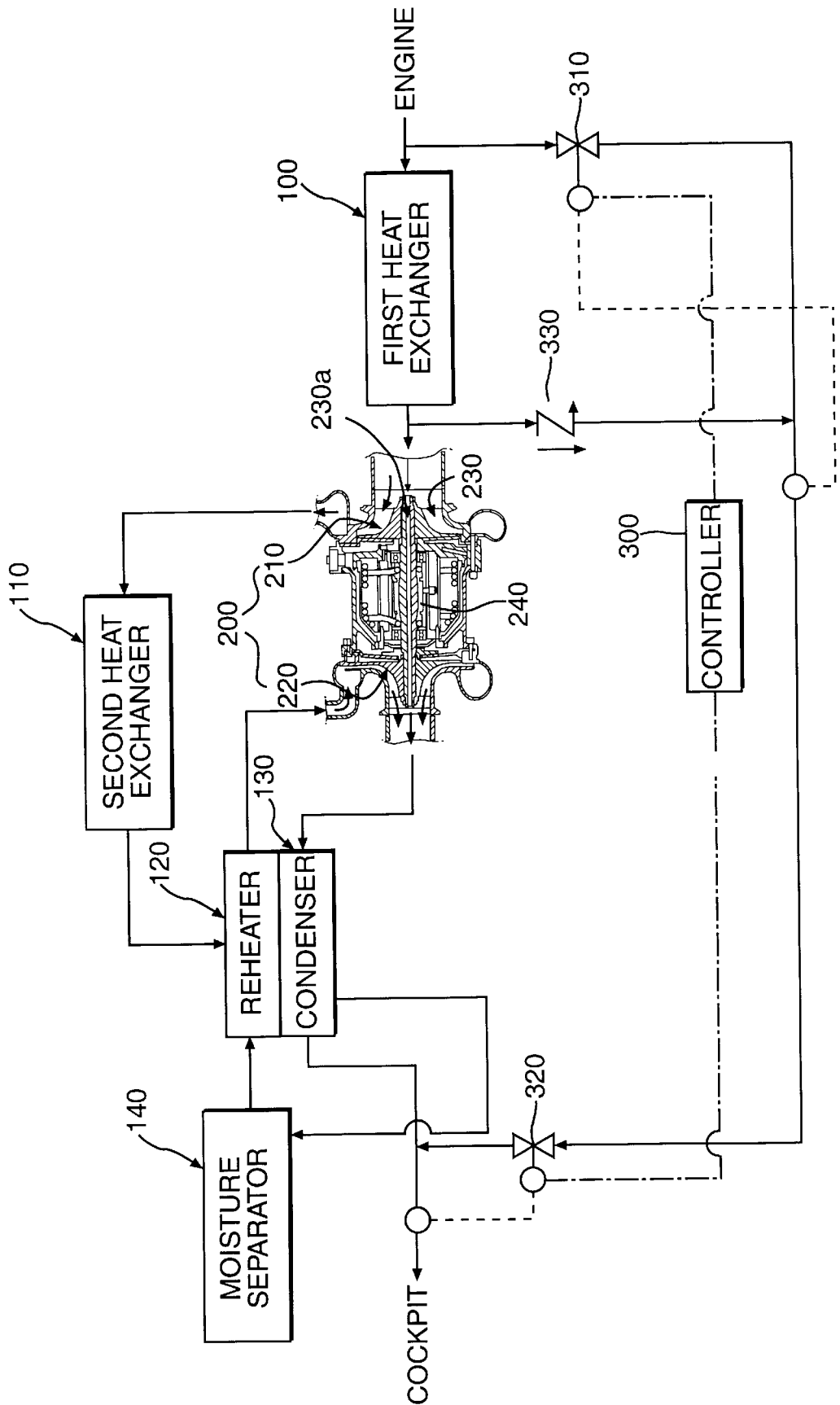
FIG. 2 is a diagram showing the structure of an air conditioning system according to a preferred embodiment of the present invention.
Figure 3:
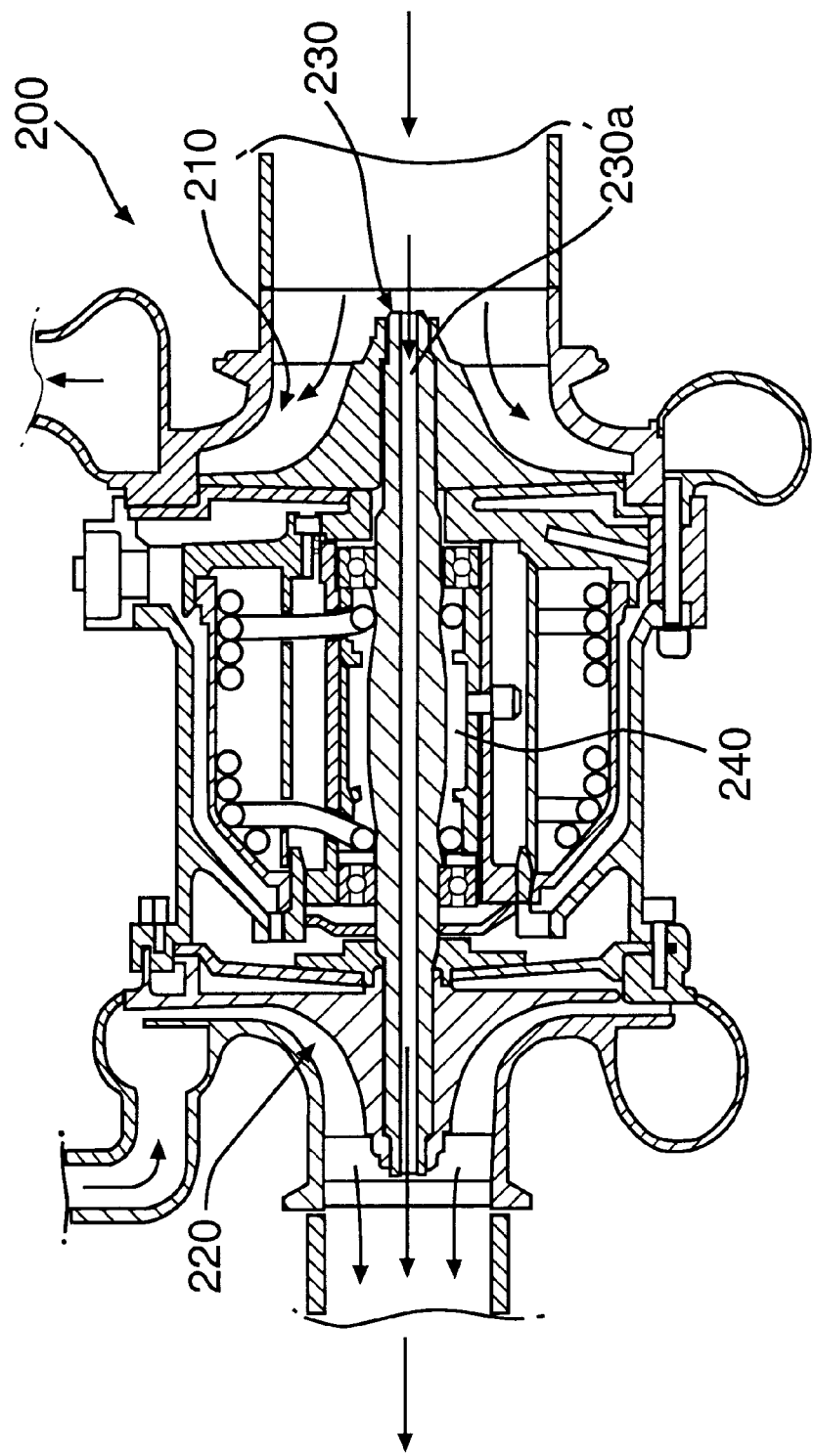
FIG. 3 is a sectional view illustrating the air cycle machine of FIG. 2.

As shown in FIGS. 2 and 3 showing a first preferred embodiment of the present invention, an air conditioning system includes a first heat exchanger 100 for dropping the temperature of a portion of high temperature and high pressure air supplied by an engine, an air cycle machine 200 having a compressor 210 for compressing the air supplied from 20 the first heat exchanger 100 and a turbine 220 for cooling the compressed air by expanding the compressed air, a second heat exchanger 110 for dropping the temperature of air supplied by the compressor 210, a reheater 120 for reheating the air, a condenser 130 for condensing the air which has passed through the reheater 120, and a moisture separator 140 for removing moisture from the condensed air. Here, the turbine 220 is coaxially coupled with a rotation shaft 230 of the compressor 210, and the rotation shaft 230 is supported by an air bearing 240 for rotation.

Reference numerals 310 and 320 represent control valves for controlling temperature of the blowing air by selectively blocking the high temperature air supplied by the engine, and reference numeral 330 represents a control valve for bypassing the air which has passed through the first heat exchanger 110. Reference numeral 300 represents a controller for opening/closing the above control valves. Accordingly, when the valves 310 and 320 open according to instructions by the controller 300, the high temperature air supplied by the engine is supplied directly to the cockpit.

According to a characteristic feature of the present invention, a hollow 230a is formed axially in the rotation shaft 230 with which the compressor 210 and the turbine 220 are coupled, as shown in FIG. 3. The hollow 230a leads to the compressor 210 and the turbine 220 and thus a portion of air flowing in the compressor 210 can be moved directly toward the turbine 220 and the condenser 130 through the hollow 230a.

In the air conditioning system having the above structure, air from the engine is cooled while passing through the first heat exchanger 100 as described earlier. The cooled air is compressed by the compressor 210 and then passes through the second heat exchanger 110, the reheater 120, the condenser 130 and the moisture separator 140, finally flowing into the turbine 220. Next, the air expands and is rapidly cooled in the turbine 220, and is supplied to a cockpit through the condenser 130. At this time, a portion of the relatively high temperature air having passed through the first heat exchanger 100 is supplied to the turbine 220 through the hollow 230a of the rotation shaft 230. This high temperature air is mixed with the cooled air exhausted from the turbine 220 and supplied into the condenser 130. Thus, moisture is hardly condensed in the condenser 130 and the condensed ice can be easily removed.

Figure 4:
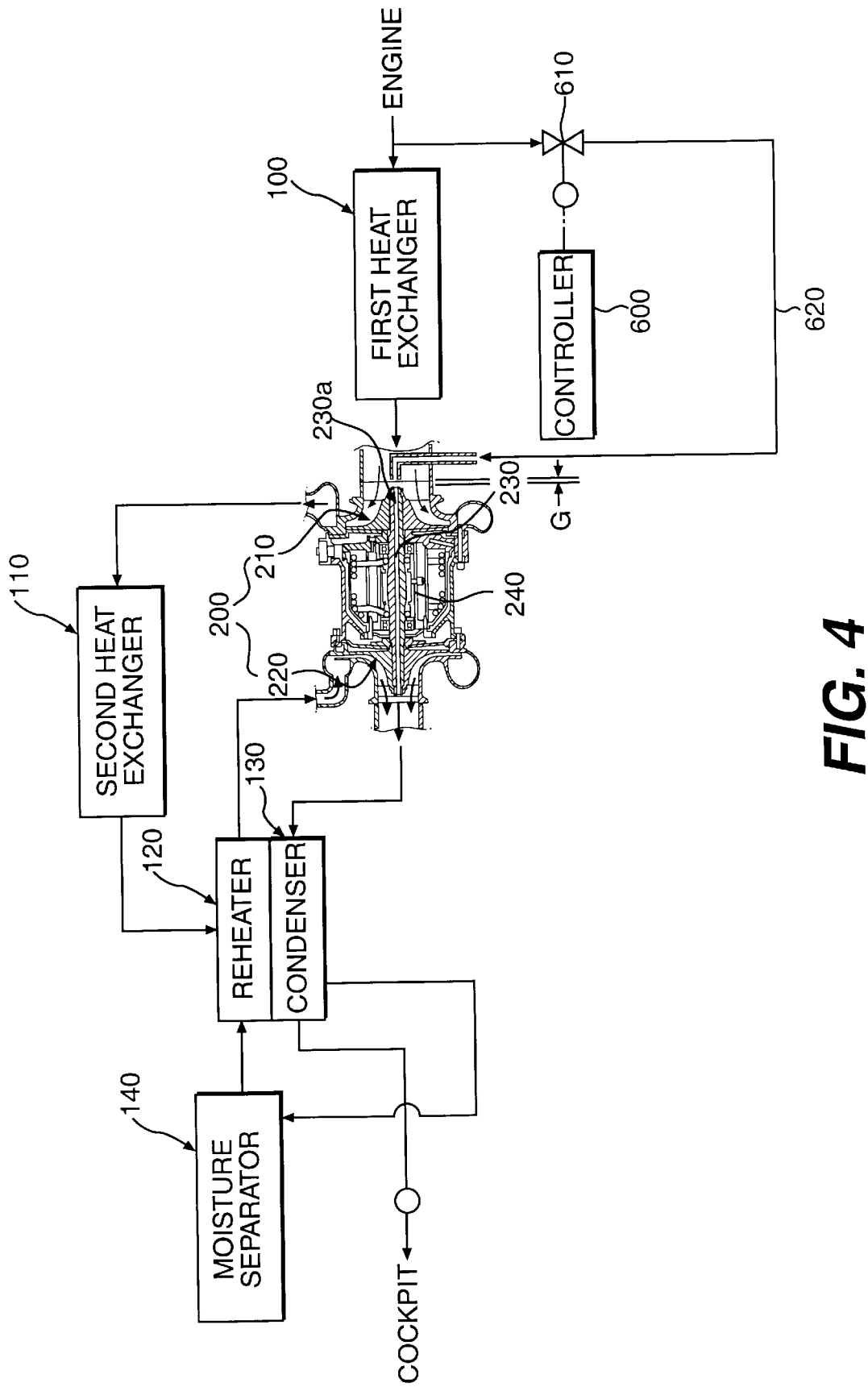
FIG. 4 is a diagram showing the structure of an air conditioning system according to another preferred embodiment of the present invention.

Referring to FIG. 4, an air conditioning system according to another preferred embodiment of the present invention will be described. Here, the same reference numerals in the drawings indicate the same members. According to this embodiment, the amount of high temperature air supplied to the turbine can be regulated. That is, as shown in FIG. 4, a connection pipe 620 is installed between an entrance of the hollow 230a formed in the rotation shaft 230 and the engine exhausting the high temperature air. Since the outlet of the connection pipe 620 and the inlet of the hollow 230a of the rotation shaft 230 are separated from each other by a predetermined distance G, the connection pipe 620 does not impede the rotation of the rotation shaft 230. Also, the connection pipe 620 is equipped with a regulation valve 610 for regulating the quantity of fluid by selectively blocking the air flowing from the engine to the hollow 230a of the rotation shaft 230, and a controller 600 for opening/closing the regulation valve 610. Accordingly, when the regulation valve 610 opens or is closed by the controller 610, the supply of the air from the hollow 230a is controlled.

When the regulation valve 610 is open, high temperature air is supplied from the engine to the turbine 220 via the connection pipe 620 and the hollow 230a of the rotation shaft 230. Thus, the cooled air exhausted from the turbine 220 and the high temperature air supplied through the hollow 230a are mixed and supplied to the condenser 130 so that condensation of moisture in the condenser 130 can be prevented and simultaneously the condensed ice can be removed. It is preferred that the time to open the regulation valve 610 should be appropriately controlled by the controller 600 so as not to lower efficiency in cooling air in the turbine 220.

As described above, in the air conditioning system according to the present invention, by passing air of high temperature through the hollow formed in the rotation shaft with which the compressor and the turbine are coupled, the condensation of moisture in the condenser can be prevented without using an additional sensor. Thus, the structure of the system becomes simplified and a control circuit for controlling the above can also be simplified.

What is claimed is:

1. An air conditioning system comprising:
   a compressor for compressing high temperature air supplied by an engine;
   a turbine for cooling the compressed air by expanding the compressed air,
   a condenser connected to said turbine for condensing moisture in the air; and
   a hollow rotation shaft coaxially coupled to and directly connecting said compressor and said turbine, wherein the hollow shaft allows a portion of the high temperature air flowing into said compressor to pass through said shaft to said turbine to mix with the air cooled in said turbine prior to being supplied to said condenser.

2. The air conditioning system of claim 1, further comprising a heat exchanger installed in an air flow path between said engine and said compressor, said heat exchanger preliminary lowering the temperature of the high temperature air supplied by said engine.

3. The air conditioning system of claim 2 further comprising:
   a second heat exchanger for again lowering the temperature of air supplied by the compressor;
   a moisture separator for removing condensed moisture from the air passed through the condenser; and
   a reheater for reheating the air passed through said moisture separator to said turbine, wherein said second heat exchanger, said moisture separator, and said reheater are disposed between said compressor and said turbine along an air flow path.

4. An air conditioning system comprising:
   a compressor for compressing high temperature air supplied by an engine;
   a turbine for cooling the compressed air by expanding the compressed air;
   a condenser connected to said turbine for condensing moisture in the air;
   a hollow rotation shaft coaxially coupled to and directly connecting said compressor and said turbine, wherein the hollow shaft allows a portion of the high temperature air exhausted from said engine to pass through said shaft to said turbine to mix with the air cooled in said turbine prior to being supplied to said condenser;
   a connection pipe between said engine and an inlet of said hollow of said shaft said pipe supplying high temperature air from said engine to said inlet; and
   a regulating means for regulating the amount of air flowing through said connection pipe.

5. The air condition system of claim 4, wherein an outlet of said connection pipe is separated from the inlet of said hollow of said rotation shaft by a predetermined distance.

6. The air condition system of claim 4, further comprising a first heat exchanger disposed between said compressor and said engine for preliminary lowering the temperature of the high temperature air supplied by said engine.

7. The air conditioning system of claim 6, further comprising:
- a second heat exchanger for again lowering the temperature of air supplied by the compressor;
- a moisture separator for removing moisture from the air condensed by the condenser; and
- a reheater for reheating the air passed through said moisture separator to said turbine, wherein said second heat exchanger, said moisture separator, and said reheater are disposed between said compressor and said turbine along an air flow path.

8. The air conditioning system of claim 4, wherein said regulating means includes a valve which selectively blocks the flow of air passing through said connection pipe and a controller for opening and closing said valve.

* * * * *